United States Patent [19]
Sutherland et al.

[11] Patent Number: 5,191,456
[45] Date of Patent: Mar. 2, 1993

[54] EFFICIENT FEEDER FIBER LOADING FROM DISTRIBUTION FIBERS

[75] Inventors: Joseph E. Sutherland, Raleigh; Paul M. Matsumura, Carrboro, both of N.C.

[73] Assignee: Alcatel Network Systems, Inc., Richardson, Tex.

[21] Appl. No.: 737,991

[22] Filed: Jul. 30, 1991

[51] Int. Cl.$^5$ ............... H04B 10/20; H04J 14/08
[52] U.S. Cl. ............... 359/118; 359/135; 370/84
[58] Field of Search ............ 359/117, 118, 125, 135, 359/137, 164; 379/59; 370/94.1, 94.2, 60, 60.1, 84

[56] References Cited

U.S. PATENT DOCUMENTS

| | | | |
|---|---|---|---|
| 4,967,405 | 10/1990 | Upp et al. | 370/58.1 |
| 4,993,019 | 2/1991 | Cole et al. | 370/85.1 |
| 5,020,132 | 3/1991 | Nazarenk et al. | 379/59 |
| 5,040,170 | 8/1991 | Upp et al. | 370/99 |

Primary Examiner—Edward L. Coles, Sr.
Assistant Examiner—R. Bacares
Attorney, Agent, or Firm—Ware, Fressola, Van Der Sluys & Adolphson

[57] ABSTRACT

In an optical fiber telecommunication transmission system, a remote terminal interfaces a high-rate optical fiber feeder line and a plurality of lower rate optical fiber distribution lines. The remote terminal includes a plurality of interfacing and signal cross-connecting devices which interface and cross-connect lower rate telephony signals with higher rate telephony signals. The plurality of interfacing and cross-connecting devices are interconnected with high-rate transmission lines so that telephony signals from under-utilized optical fiber distribution lines may be concentrated onto the high-rate optical fiber feeder line for efficient use of the feeder line.

10 Claims, 3 Drawing Sheets

*LCX-50/150 CENTRAL OFFICE TERMINAL (COT) FOR ANALOG SWITCH OR TM-50 (OC-1)/ADM-150 (OC-3) FOR DIGITAL SWITCH

NOTE: EACH (RESIDENTIAL) OPTICAL NETWORK UNIT (ONU) SUPPORTS UP TO 8 LIVING UNITS (2 POTS LINES PER LIVING UNIT)

EFFICIENT FEEDER FIBER LOADING FROM DISTRIBUTION FIBERS

CROSS-REFERENCE TO RELATED APPLICATIONS

This application describes an invention which is related to a plurality of inventions covered by the following commonly-assigned and, in some cases, copending U.S. patent applications: Ser. No. 351,861 filed May 12, 1989; Ser. No. 452,291 filed Dec. 15, 1989; Ser. No. 295,887 filed Jan. 11, 1989, now U.S. Pat. No. 5,014,268, issued May 7, 1991; Ser. No. 351,458 filed May 12, 1989; Ser. No. 451,419 filed Dec. 15, 1989; Ser. No. 451,436 filed Dec. 15, 1989 now U.S. Pat. No. 4,993,019 issued Feb. 12, 1991; Ser. No. 547,383 filed Jul. 3, 1990, now U.S. Pat. No. 5,027,349 issued Jun. 25, 1991; Ser. No. 616,175 filed Nov. 20, 1990; and co-pending applications Ser. No. 07/738,111, entitled "Switched Video Architecture for an Optical Fiber-to-the-Curb Telecommunications System"; Ser. No. 07/738,188, entitled "Switched Video Distribution Apparatus and Method"; Ser. No. 07/739,203, entitled "Fiber Optic Link"; and Ser. No. 07/738,102, entitled "Subscriber Loop Testing in a Fiber-to-the-Curb Telecommunications Network", all filed on even date herewith. The disclosures of the above-mentioned patents and patent applications are incorporated herein by reference.

BACKGROUND OF THE INVENTION

1. Field of the Invention

The present invention relates to an apparatus and method for efficiently loading feeder optical fibers from fractionally-utilized distribution fibers.

2. Description of the Prior Art

Optical fibers are rapidly becoming the preferred means for transmission in telecommunications systems. The advantages of using optical fibers are well known and are fully accepted as being desirable. Optical fiber transmission provides exceedingly wide bandwidths which will allow for the future provision of broadband services directly to individual subscribers on a relatively universal basis. Such broadband services may include data transmission; however, there is a broader market for the distribution of video services over the telecommunications network to the vast number of residential subscribers.

While the use of optical fibers as the transmission medium is clearly desirable, systems designers are faced with a problem of how to maintain feeder efficiency while distribution fiber efficiency lags during the emergence of the broadband services. The installation of optical fiber transmission systems is a costly undertaking; therefore, these systems must be used as efficiently as possible to provide a rapid return on the investment for the telecommunications company.

There have been many proposals for providing fiber optic services to residential subscribers in both narrowband and broadband format. Some of these proposals have been described in the Description of the Prior Art set forth in the afore-mentioned co-pending application entitled, "Switched Video Architecture for an Optical Fiber-to-the-Curb Telecommunication System". Various articles have been published describing the advantages of fiber optic systems, and in particular, the advantages of certain types of broadband fiber optic systems.

An article entitled: "A Future Switched Video System" by John R. Gunter, *IEEE LCS Magazine*, February, 1990, at page 66 and following, describes the desirability of providing video services over the telecommunications network. Another article entitled: "A High-Quality Switched FM Video System" by David E. Robinson and David Grubb, III, *IEEE LCS Magazine*, also published February, 1990, at page 53 and following describes a proposed system architecture wherein the various video channels are frequency multiplexed onto a carrier; however, the carrier uses wavelength division multiplexing for upstream and downstream transmissions.

Other articles describing the simultaneous transmission of narrowband and broadband signals are as follows: "A Hybrid Lightwave Transmission System for Subcarrier Multiplexed Video and Digital B-ISDN Services in the Local Loop", by Charles N. Lo, *Journal of Lightwave Technology*, Vol. 7, No. 11, November, 1989, pp. 1839–1848; and "Fiber Optic Analog-Digital Hybrid Signal Transmission Employing Frequency Modulation", by K. Sato et al, *IEEE Transactions on Communications*, Vol. COM-33, No. 5, May 1985, pp. 433–441.

In anticipation of future acceptance by residential subscribers of the full capability of a fiber optic transmission system and, in particular, the use of broadband services, it is desirable to install distribution fibers throughout residential neighborhoods to prepare to handle the future broadband traffic. Unfortunately, these distribution fibers are under-utilized when they initially carry only narrowband traffic, such as Plain Old Telephone Service (POTS).

For design reasons and system simplicity, signals on the distribution fibers within the residential neighborhood normally run at some fixed rate with a standard maximum payload, such as a DS1 payload of 24 DS0 channels. In most neighborhoods, it is difficult to initially utilize the full capability of the payload on distribution fibers; however, this inefficient under-utilization is the price that the telephone service provider must pay for being prepared for future growth.

However, business considerations demand that the more centralized feeder plant and feeder fibers be more efficiently used, so as to minimize the commercial effect of the inefficient distribution plant. Thus, every effort must be made to increase the efficiency of the centralized feeder plant during the emergence of the broadband services.

SUMMARY OF THE INVENTION

The present invention contemplates an apparatus and method for providing efficient loading of the optical fiber feeder plant from the under-utilized distribution fibers.

The afore-mentioned co-pending application entitled, "Switched Video Architecture for an Optical Fiber-to-the-Curb Telecommunication System" discloses a truly integrated fiber optic telecommunications system providing switched video and standard narrowband telephone services. The system is integrated, in that it transmits video services on the same fiber as the narrowband services and uses common equipment to support both services.

In said system, the feeder fiber from a Central Office (CO) services a Remote Terminal (RT) over a single fiber pair (Tx and Rx) operating at a SONET OC-1 (51.84 Mb/s) or OC-3 (155.52 Mb/s) data rate. The RT includes Loop Carrier cross-Connect (LCX) hardware for cross-connecting and distributing DS0 channels. The system uses a star distribution network where optical fibers radiate from the RT to active Optical Network Units (ONU) located in residential areas. Each residential ONU serves up to eight living units, with three DS0 (64 Kb/s) channels. For residential applications, two channels are typically used for Plain Old Telephone Service (POTS), with the third channel reserved for future applications, such as the D-channel for an Integrated Services Digital Network (ISDN).

The system provides a Loop Carrier Cross-connect-Fiber-To-The-Curb (LCX-FTC) system, which is an advanced SONET-compliant Digital Loop Carrier system that offers telephone companies immediate and future access to narrowband and broadband functionality. The system is designed around a family of SONET access products produced and sold by Alcatel NA Network Systems Corp., the assignee of the present invention, under product designations LCX-50 and LCX-150. The LCX-FTC system utilizes optical fibers instead of metallic lines in the local loop. The fiber-to-the-curb components of the system are built upon the LCX hardware and software platforms of Alcatel to provide an easy migration to the FTC services. The system is modular by design and can be configured to accommodate many different applications.

The above-mentioned patents and patent applications which have been cross-referenced as related inventions fully describe the members of the family of access products upon which the present invention is based. Accordingly, the teachings included in these patents and patent applications are incorporated herein by reference.

The remote terminal of the present invention utilizes an LCX-50 core for cross-connecting and grooming the DS0 channels; however, the present invention uniquely uses a plurality of LCX-50 cores in each remote terminal site to function as a concentrator so that channels from many distribution fibers may be concentrated to efficiently load the feeder fiber.

It is a primary objective of the present invention to provide an apparatus and method for efficiently loading a feeder fiber from a plurality of fractionally loaded distribution fibers.

DETAILED DESCRIPTION OF THE INVENTION

Figure 1:
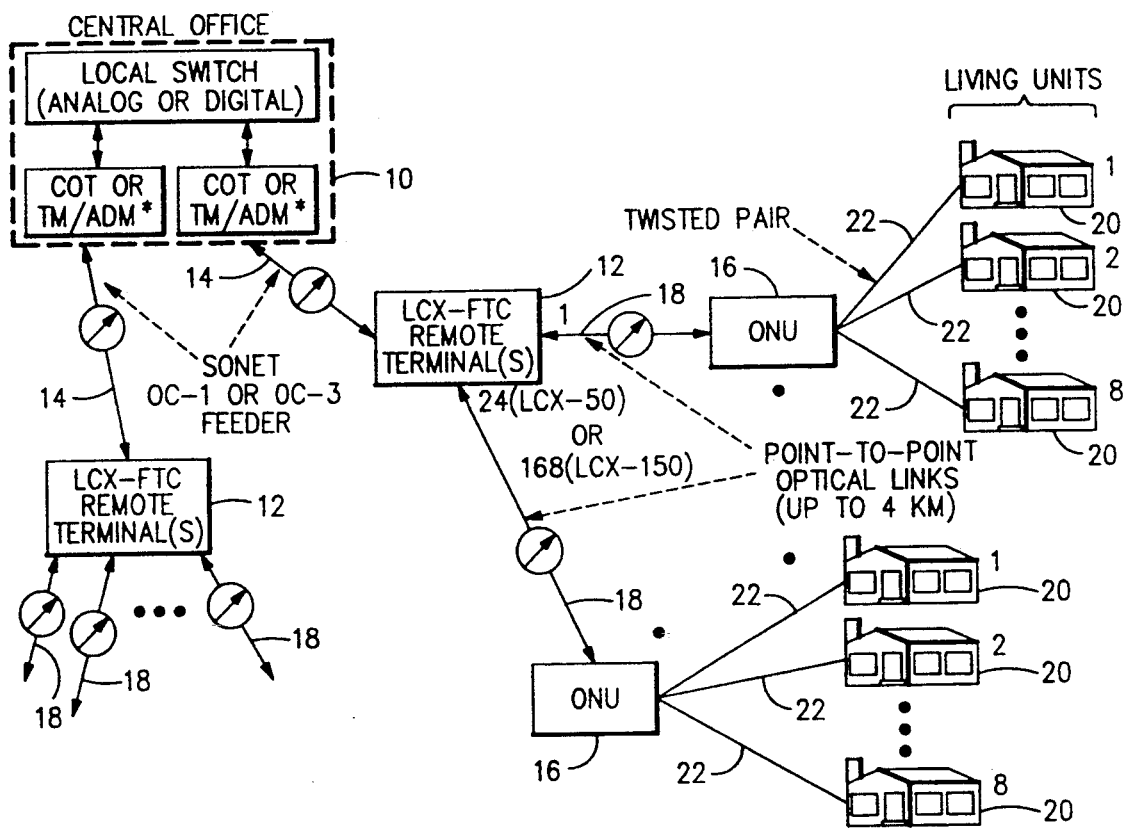
FIG. 1 is a block diagram of a basic narrowband fiber-to-the-curb architecture.

Referring to FIG. 1 there is shown a Central Office (CO) 10 connected to Remote Terminals (RT) 12 via SONET OC-1 or OC-3 optical feeders 14 which function as a digital transport link therebetween. The carrier rate used for transport depends upon the current and anticipated channel capacity required. The CO 10 may include either an LCX-50 or LCX-150 Central Office Terminal (COT) for UDLC arrangements or a TM-50 or ADM-150 for IDLC arrangements. The UDLC system is suited for COs with an analog switch using metallic line shelves to provide the analog interface to the switch. The IDLC system arrangement provides a DSX-1 interface with TM-50 or ADM-150 units for COs using a digital switch. Both TR-8 and TR-303 digital interfaces are supported by the LCX-FTC system. An LCX-50 core provides the platform for OC-1 rate transmission and an LCX-150 core will provides a platform for OC-3 rate transmission. The structures necessary for the TM-50 and ADM-150 units are similar to those disclosed in the aforementioned U.S. patent application, Ser. No. 351,861 filed May 12, 1989 and the structures for LCX-50 and LCX-150 cores are disclosed in U.S. patent application, Ser. No. 452,291, filed Dec. 15, 1989.

The telecommunications system uses a star distribution network where the optical fibers radiate from the RTs 12 to active Optical Network Units (ONUs) 16 via point to point optical distribution links 18. Each RT 12 can serve up to 24 ONUs through optical links 18 when the RT is equipped with a LCX-50 or 168 ONUs when an LCX-150 is utilized. Each ONU 16 can service up to eight living units or homes 20 and are connected thereto through the use of metallic twisted pairs and coaxial drops 22 depending on the service required in each living unit. Typically each living unit will be provided with three DS0 channels, two channels for providing (POTS) and a third channel reserved for future applications such as the D-channel for ISDN.

Figure 2:
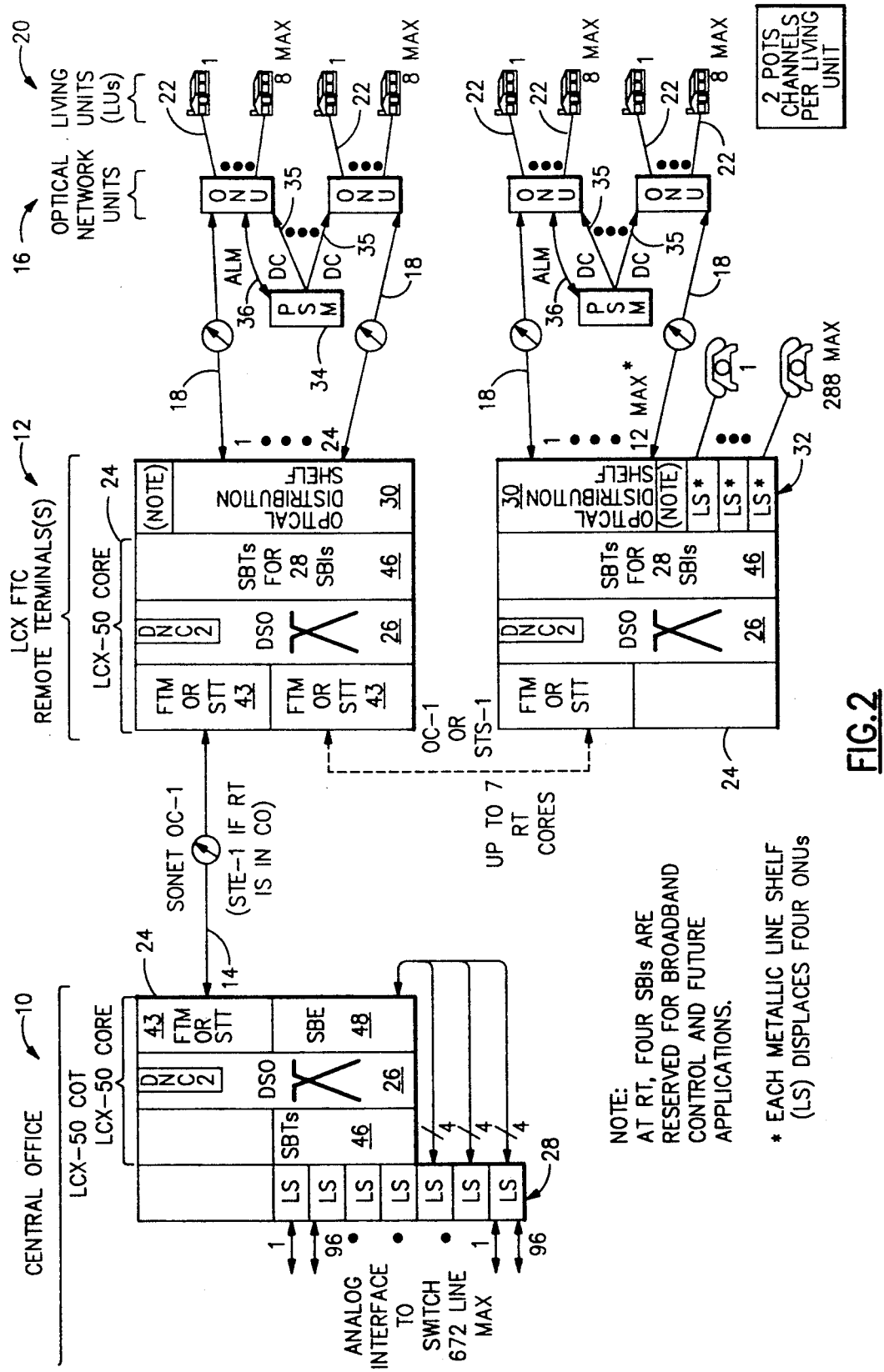
FIG. 2 is a block diagram illustrating in greater detail the components of FIG. 1.

Referring to FIG. 2 there is shown greater detail of the LCX-50 core 24 as used in the CO 10 and RT 12. The LCX-50 core 24 utilizes a non-blocking switch fabric in the form of a time slot interchanger 26 which allows for switching of the various subscriber channels. In the RT 12 the time slot interchanger 26 allows the subscriber channels from ONUs 16 to be loaded and groomed over the RT to CO feeder 14 for optimum capacity and ease of administration. As shown in FIG. 2 several RT cores 24 can share the same feeder 14 to provide a distribution arrangement for additional flexibility and channel density. The ability of the RT to groom and reassign subscriber channels to different time slots allows more flexibility in the planning and placement of ONUs. The time slot interchanger 26 utilized in the core is constructed as shown in U.S. patent application Ser. No. 295,887 filed Jan. 11, 1989, which is incorporated herein by reference.

The configuration shown in FIG. 2 is adapted for use with a voice-grade analog switch interface and is thus a UDLC system based on a LCX-50 core. It is to be understood that a LCX-50 core can also support a system for use with an IDLC configuration and that the LCX-150 core could be used in an IDLC configuration that provides TR-303 compatibility.

The system shown in FIG. 2 includes a COT in CO 10 and a RT 12 having a plurality of cores 24 connected to the COT via a SONET OC-1 feeder 14. Optical distribution links 18 extend to the ONUs 16. Interface to the analog switch is provided by metallic line shelves 28 which accommodate channel unit plug-ins to perform the analog/digital conversions on the transmission signal and present voice frequency and baseband interfaces to the switching system. Up to seven line shelves 28 can be serviced by an LCX-50 core 24, with each line shelf providing 96 subscriber lines, for a total of 672 lines. When CO 10 is updated to a digital switch providing an integrated TR 303 interface, the LCX-FTC system can easily be upgraded to the new digital switching environment.

In the RT 12, the core 24 is connected to an Optical Distribution Shelf (ODS) 30 which provides the housing for plug-in electronics that provide the fiber optic interfaces to the ONUs. The ODS 30 is used in place of the metallic line shelves 28; however, if some metallic lines are terminated at the RT 12, a number of shelves may be equipped for metallic lines, as shown at 32. However, each metallic line shelf reduces the number of ONUs served by the ODS by four. A fully-equipped ODS has positions for 28 optical interfaces; however, only 24 are used for residential applications.

The residential ONUs 16 are sealed enclosures contemplated for use in a neighborhood right-of-way near the subscriber residence that it serves. The ONU provides electronics that perform the optical/electrical conversions required and also houses channel plug-in units that provide the narrowband interface to the living units. The channel plug-in units utilized in the ONU are substantially identical to those used in the LCX-50 metallic line shelves.

In many instances, the living unit containing customer premises equipment may be connected directly to the CO 10 without the need of a digital loop carrier system, such as the feeder link between RT 12 and CO 10. In such instances the equivalent of RT 12 would be co-located with the CO equipment. When the RT is co-located in the CO, economical electrical STS-1 connections may be used in place of the optical OC-1 feeder.

In FIG. 2, there is shown a Power Services Module (PSM) 34 associated with groups of ONUs 16. The PSM 34 is a free-standing cabinet designed to provide power to the active elements contained in the ONUs. Alarm connections 36 are also provided between the PSM and an ONU for providing alarm signals back to the RT or CO in the event of a failure in the PSM 34.

It should be noted that up to seven LCX-50 cores 24 may be connected together in one RT site, utilizing OC-1 or STS-1 interconnections. Switched video signals may be provided to the ODS 30 in each LCX-50 core 24.

Figure 3:
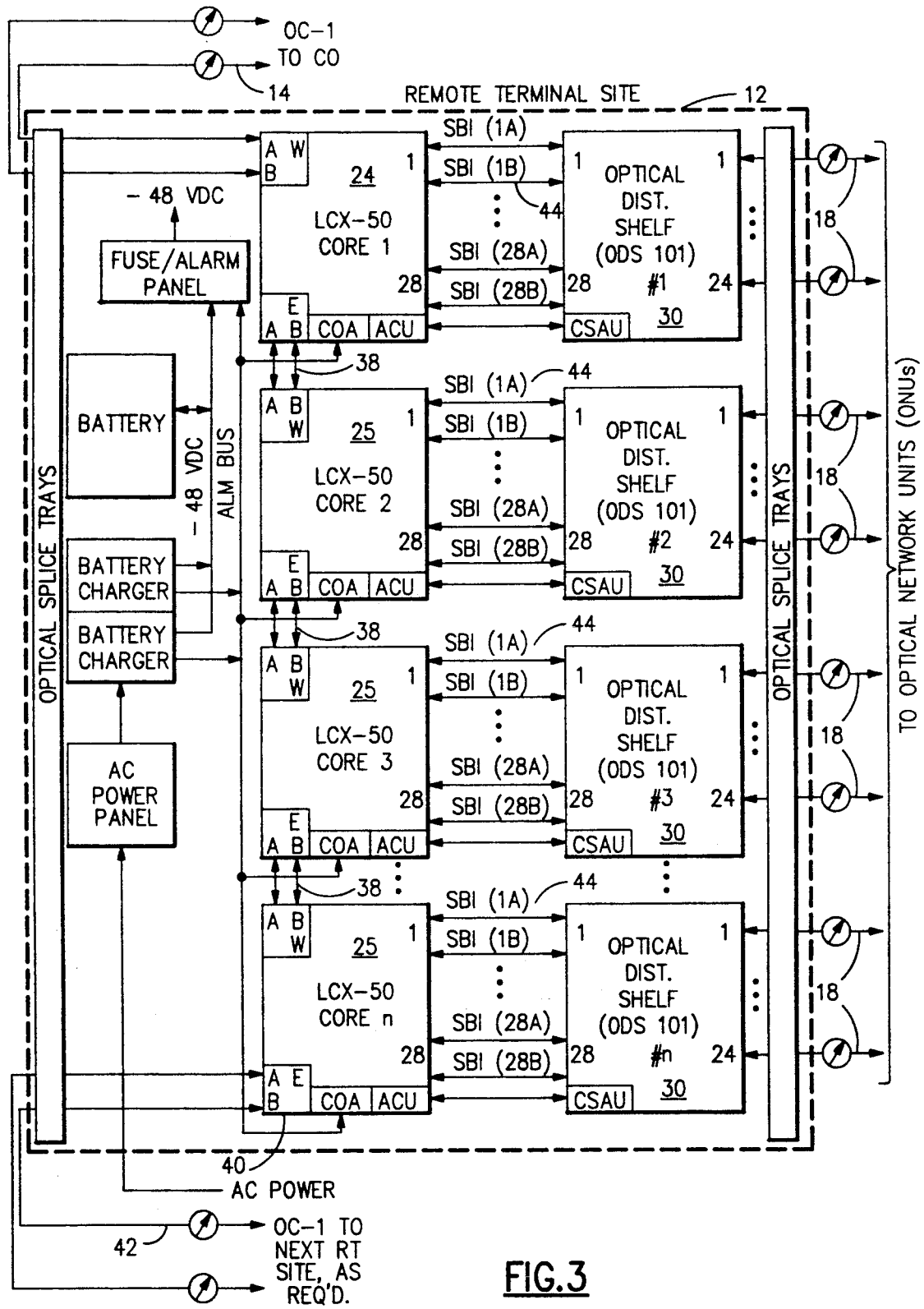
FIG. 3 is a block diagram showing the detailed construction of a remote terminal equipped for narrowband services and constructed in accordance with the present invention.

FIG. 3 shows an arrangement wherein an OC-1 feeder 14 from the CO 10 is terminated at one LCX RT core 24, with additional LCX RT cores 25 interconnected with electrical STS-1 high-speed links 38. With this type of add-drop arrangement, the timeslots or channels in the OC-1 feeder 14 from the CO can be efficiently utilized, even when the channel capacity of all ONUs is not fully utilized. The last LCX RT core 25 in the add-drop string of cores may be equipped with an FTM-OC1 interface 40 to continue the string of cores to another RT site via another OC-1 feeder 42.

The ODS 30 is responsible for providing an interface between the LCX RT core 24 and the distribution fibers 18 to the ONUs 16. The transport and control connections between the LCX RT cores 24 and 25 and the ODS 30s are via 4 Mb/s balanced serial bus links referred to as Serial Bus Interfaces (SBI) 44. The SBI is an internal electrical bus used in the SONET access products of Alcatel and is fully described in the afore-mentioned U.S. patent application Ser. No. 351,458, filed May 12, 1989, which is incorporated herein by reference. The SBI includes a usable payload of 24 DS0 channels or one DS1 signal. The SBI is uniquely used to supply the distribution fibers 18 for the local loops. The optical signal transmitted over distribution fibers 18 is also at a 4 Mb/s serial data link, and is essentially an optical SBI.

It should be noted that the OC-1 feeder line 14 is redundant and comprises lines A and B, said redundancy is carried through the LCX-50 core and also in the SBIs 44 which are also shown as A and B SBIs. It should be further noted that in FIG. 2, there are provided fiber optic transceivers (FTM) 43, which may be replaced by STS-1 electrical transceivers (STT) if the feeder line is a limited distance electrical STS-1 line, as opposed to an optical carrier. In addition, the LCX-50 cores include Serial Bus Transceivers (SBT) 46 for interfacing with the SBIs 44. The LCX-50 core 24 located within the CO 10 also includes a Serial Bus Expansion unit (SBE) 48 to facilitate connection to additional line shelves 28.

The typical add-drop multiplexer (ADM), such as the ADM-150 mentioned earlier, is deployed at different sites in remote areas to provide limited numbers of channels to local residences. The ADMs are spaced at different locations along the typical OC-1 optical transmission line.

The applicants have discovered that by uniquely using the LCX-50 core of a typical ADM-50, and by co-locating a plurality of said cores at one site, a remote terminal may be formed which can service a plurality of optical network units dispersed in different residential areas, while functioning as a concentrator to provide efficient loading of the feeder fiber 14. Thus, the add-drop capability of the ADM-50 SONET access product can be uniquely used to solve the problem of efficiently loading an optical feeder. The number of cores needed to load the feeder varies inversely with the fractionality of the distribution fibers 18. For example, if an average of one-fourth of the DS0s on distribution fibers are assigned active subscriber lines, then four cores 24 would be needed to fully load up the feeder line 14. The cores 24 may be inexpensively co-located within a remote terminal housing and interconnected by low-cost short-range metallic cables. By co-location of the cores within the same housing, many of the overhead components may be efficiently shared by the co-located cores.

What is claimed is:

1. A remote terminal (12) for an optical fiber communications system, comprising:
    first means (24) for interfacing and cross-connecting a high-rate communication signal on an optical fiber feeder line (14) with a lower-rate communication signal on a first optical fiber distribution line (18);
    said first means (24) having a first high speed port for connecting said first means (24) to said optical fiber feeder line (14); and
    wherein said remote terminal can have additional interfacing and cross-connecting means (25) each having first and second high speed ports of their own interconnected to a second high speed port of said first means (24) using high-rate communication transmission lines (38), whereby lower-rate communication signals from under-utilized optical fiber distribution lines (18) connected to the interfacing and cross-connecting means (25), can be cross-connected and provided onto the high-rate communication transmission lines (38) for being provided access onto the high-rate optical fiber feeder line (14) whereby unutilized time slots in a lower-rate communication signal on said first optical fiber distribution line are utilized by said additional interfacing and cross-connecting means (25) to achieve efficient use of the feeder line (14).

2. A remote terminal as described in claim 1, wherein the interfacing and cross-connecting means each comprise an add-drop multiplexer.

3. A remote terminal as described in claim 1, additionally comprising means associated with one of said interfacing and cross-connecting means for connecting to a next remote terminal by way of a high-rate communication transmission line.

4. A remote terminal as described in claim 1, wherein the high-rate optical fiber feeder line is a SONET OC-1 transmission line.

5. A remote terminal as described in claim 1, wherein the high-rate optical fiber feeder line is a SONET OC-3 transmission line.

6. A remote terminal as described in claim 1, wherein the means for interconnecting comprises an STS-1 transmission line.

7. A remote terminal as described in claim 1, wherein the means for interconnecting comprises a SONET OC-1 transmission line.

8. A remote terminal as described in claim 1, wherein the means for interconnecting comprises a SONET OC-3 transmission line.

9. A remote terminal as described in claim 1, wherein each of the plurality of optical fiber distribution lines comprise transmission lines having a nominal rate of 4 MHz and provide for the transmission of 24 DS0 channels.

10. A remote terminal as described in claim 1, wherein one of said first and second ports of one of said additional means (25) is connected (42) to another remote terminal, the remaining ports of said one of said additional means (25) being connected in a series arrangement of remaining additional means (25) for connection to said second high speed port of said first means (24).

* * * * *